Feb. 12, 1929.

R. GUNN 1,701,975

DEVICE FOR INDICATING SMALL CHANGES OF CAPACITY

Original Filed May 28, 1924

Inventor
Ross Gunn
By Wooster & Davis
Attorneys

Patented Feb. 12, 1929.

1,701,975

UNITED STATES PATENT OFFICE.

ROSS GUNN, OF WASHINGTON, DISTRICT OF COLUMBIA.

DEVICE FOR INDICATING SMALL CHANGES OF CAPACITY.

Application filed May 28, 1924, Serial No. 716,334. Renewed July 12, 1928.

This invention relates to an indicator, and has for an object to provide a device which will indicate the small capacity changes between two conductors which takes place when a third conductor is brought into proximity to these two conductors, and it is also an object of the invention to utilize these small capacity changes to indicate certain facts which it is desired to be known. For example, suppose there are two wires attached to the wings of an aeroplane; when these two conductors approach a third conductor (the earth) as the aeroplane approaches the ground, there will be a change of capacity between these two conductors, and obviously if one had an indication of this change of capacity it would be possible to calibrate the indicating instrument in terms of the altitude of the aeroplane above the ground. A similar use would be to place the two conductors around a restricted area and utilize the change of capacity between these conductors caused by the approach of a person to this area, to sound an alarm or operate any other indicating device.

Figure 1:
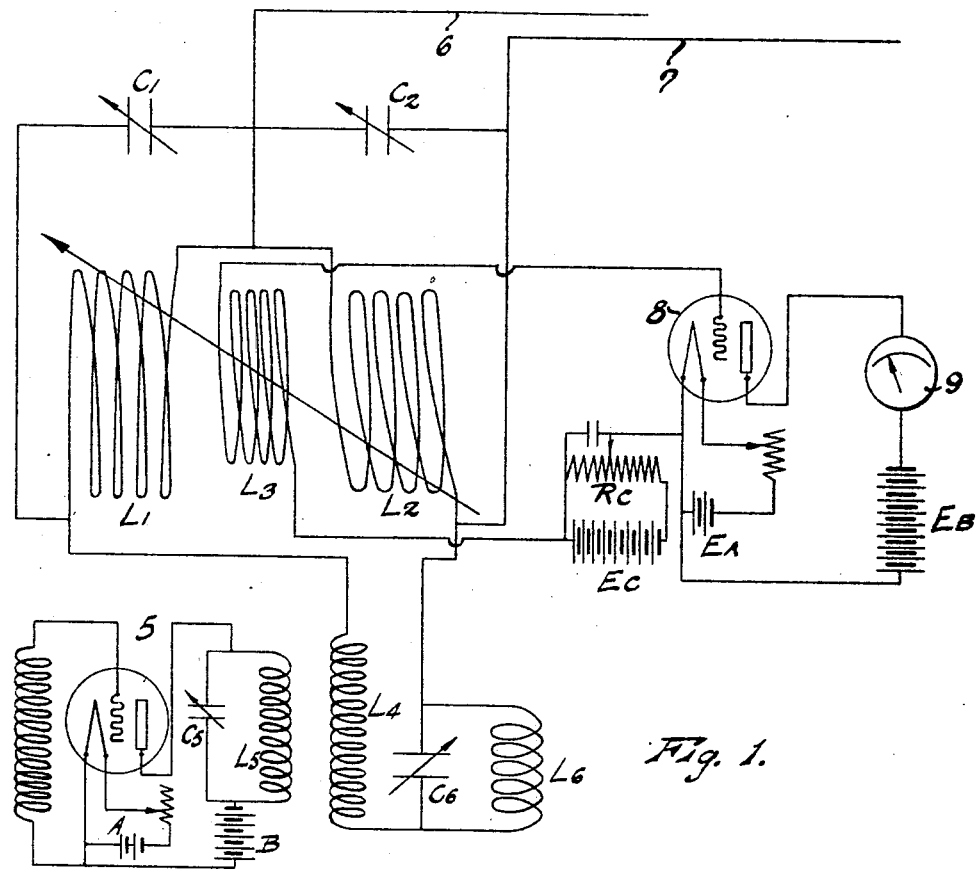
Figure 2:
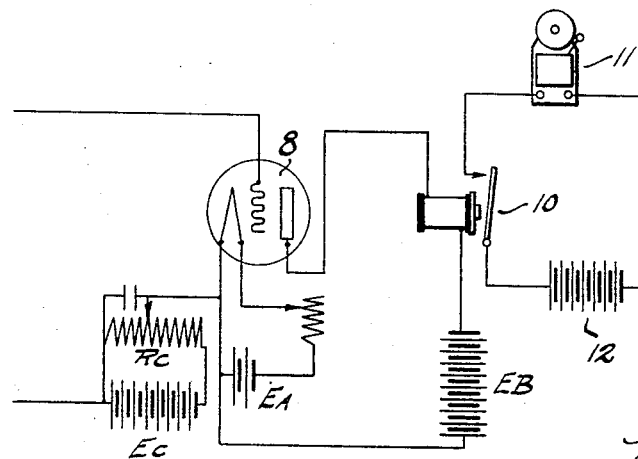

With the foregoing and other objects in view, I have devised the device illustrated in the accompanying drawing forming a part of this specification, similar reference characters being employed throughout the various figures to indicate corresponding elements. In this drawing, Fig. 1 illustrates an arrangement and connection of apparatus for indicating the small changes in capacity between two conductors by their approach to a third conductor as above noted, and Fig. 2 illustrates the use of a slightly different type of indicating device.

The invention is made up broadly of three component parts; first, a suitable source of electrical oscillations of high frequency, or oscillator; second, a pair of differentially connected oscillating circuits fed from a coupling coil connected to the oscillator, to which circuits the pair of conductors are connected, between which the changes of capacity are to be indicated, and a third or output coil coupled in a definite manner to these two oscillating circuits; and third, a "control valve" properly connected so that the energy in the output coil will control the current flowing in the plate circuit of a vacuum tube. This plate circuit is utilized to control a suitable meter or relay so that the effect on this circuit of the changes of capacity between the conductors may be observed directly or may control a light, bell or other indicating device.

In the layout illustrated, 5 is a vacuum tube oscillator of standard construction including the tuned oscillating circuit $C^5$—$L^5$ and the usual "A" and "B" batteries in the filament and plate circuits respectively. As this oscillator is of the standard and well-known construction, no further description is deemed necessary. Coupled to this oscillator through the coupling coil $L^4$ is a pair of differentially connected tuned circuits $C^1$—$L^1$ and $C^2$—$L^2$, each of which circuits are coupled through the coils $L^1$ and $L^2$ to a third circuit through the coil $L^3$, and these circuits are so coupled that the voltage induced in the third circuit through the coil $L^3$ depends on the difference of the voltages due to each of the two circuits $C^1$—$L^1$ and $C^2$—$L^2$. Thus if both circuits $C^1$—$L^1$ and $C^2$—$L^2$ are tuned to the same frequency and are similar in all respects, the voltage induced in the third coil $L^3$ will be practically zero. The two conductors 6 and 7, the capacity changes between which are to be indicated on their approach to a third conductor, are connected between the circuits $C^1$—$L^1$ and $C^2$—$L^2$ substantially as shown.

It will be apparent that these two conductors 6 and 7 are so connected to the circuit $C^2$—$L^2$ as to form a condenser connected in parallel with said circuit. The third coil $L^3$ is connected to the grid circuit of a three electrode vacuum tube 8 which tube is utilized to indicate the capacity changes. In the use of this system, however, it is not necessary that the two circuits $C^1$—$L^1$ and $C^2$—$L^2$ be so constructed and tuned that the voltage induced in the coil $L^3$ is practically zero, for by connecting a source of biasing voltage to the grid circuit it is possible to eliminate undesired effects produced when the difference is not zero. For this purpose a battery $E^c$ with a suitable variable resistance $R^c$ is connected to the grid circuit, and through this adjustable resistance the bias on the control tube 8 is adjusted to get the desired condition of sensitivity. In general the value of the grid bias is adjusted so that it is at least sufficient to reduce the current in the plate circuit of the tube 8 to practically zero. The desired indicating device, such as a meter 9 or other suitable device, as a light, or relay controlling an indicator, is connected to this plate circuit which includes the necessary battery $E^B$. In Fig. 2 instead of the meter 9 I have shown a relay 10 in the plate circuit which controls another circuit including a bell or light 11 operated by a battery 12.

This layout is very sensitive, but in order to stabilize the system and make it more sensitive and easy to adjust, I connect to the two tuned circuits $C^1$—$L^1$ and $C^2$—$L^2$ an auxiliary tuned circuit $C^6$—$L^6$. This circuit is not absolutely necessary to the successful operation of the device but it is used to increase the sharpness of tuning and as the impedance of a circuit like this changes very rapidly as the frequency approaches the natural frequency of the circuit, the sharpness of resonance, or tuning, is increased.

In operation the two circuits $C^1$—$L^1$ and $C^2$—$L^2$ are tuned to the desired frequency and when the auxiliary circuit $C^6$—$L^6$ is used it is tuned to approximately the same wave length or frequency as the other circuits. Then the biasing voltage $E^C$ on the grid circuit of the control tube 8 is adjusted to get the desired condition of sensitivity. In general this grid bias is adjusted to reduce the plate current to approximately zero. Assuming now that the two conductors 6 and 7 are mounted on the wings of an aeroplane, as the aeroplane approaches the earth there will be a change of capacity between these conductors which will upset the balance between the circuits $C^1$—$L^1$ and $C^2$—$L^2$, and will, therefore, cause a change in the induced voltage in the coil $L^3$ and the grid circuit of the control tube 8. This will, therefore, cause a change in the current in the plate circuit depending upon the amount of the change of capacity between the two conductors 6 and 7, which is indicated on the meter 9. Therefore, this meter may be calibrated in terms of the altitude above the ground so as to indicate the distance of the aeroplane above the earth.

There are numerous other uses for which the device may be used, as for instance, the approach of a person to a restricted area. That is, the conductors 6 and 7 may be placed around a restricted area, as a bank vault and the current change in the plate circuit of the control tube 8 caused by the change of capacity between the two conductors 6 and 7 as a person approaches the vault, may be used to sound an alarm, such as a bell, as shown in Fig. 2.

This device is an extremely sensitive one for measuring small changes of capacity, or of any of the electrical constants, such as frequency or inductance, and it may be used for indicating these small changes on an instrument of sufficient ruggedness to be used in practical work. Furthermore, it is influenced very slightly by spurious or external effects and it is also comparatively easy and simple to adjust. On a test set up with the condenser $C^2$ at approximately one hundred and seventy-five micro-microfarads it was possible to measure with a comparatively rugged meter capacity variations of approximately one one-hundred thousandth of a micro-microfarad.

Having thus set forth the nature of my invention, what I claim is:

1. In combination, a source of high frequency electrical oscillations, a pair of tuned circuits coupled therewith, a third circuit coupled to the first two circuits in such a way that the voltage induced in the third circuit depends on the difference between the voltages due to the respective first mentioned circuits, a pair of conductors so connected to one of the first mentioned circuits as to form a condenser connected in parallel with said circuit, a three electrode vacuum tube having its grid and filament connected to said third circuit, a circuit to which the plate and filament of the tube are connected, and an indicating device connected to said plate circuit.

2. In combination, a source of high frequency electrical oscillations, a pair of connected tuned circuits differentially coupled with each other and also coupled with said source of high frequency oscillations, a pair of conductors so connected to one of said circuits as to form a condenser connected in parallel with said circuit, a third circuit coupled to the first two circuits, a three electrode vacuum tube having its grid and filament connected to the third circuit, a circuit to which the plate and filament of the tube are connected, and an indicating device connected to said plate circuit.

3. In combination, a source of high frequency electrical oscillations, a pair of differentially connected tuned circuits coupled therewith, a third circuit coupled to both the first mentioned circuits, a three electrode vacuum tube having its grid and filament connected to said third circuit, a circuit to which the plate and filament of the tube are connected, and an indicating device connected to said plate circuit.

4. In combination, a source of high frequency electrical oscillations, a pair of differentially connected tuned circuits coupled therewith, a pair of conductors so connected to one of said circuits as to form a condenser connected in parallel with said circuit, a third circuit coupled to both the first mentioned circuits, a three electrode vacuum tube having its grid and filament connected to said third circuit, means for biasing the voltage in the grid circuit, a circuit to which the plate and filament of the tube are connected, and an indicating device connected to said plate circuit.

5. In combination, a source of high frequency electrical oscillations, a pair of tuned circuits coupled therewith, a third circuit coupled to both the first mentioned circuits in such a way that the voltage induced in the third circuit depends on the difference between the voltages due to the respective first mentioned circuits, a three electrode vacuum tube having its grid and filament connected to said third circuit, means for biasing the voltage in the grid circuit, a circuit to which the plate and filament of said tube are connected, and an indicating device connected to said plate circuit.

6. In combination, a source of high frequency electrical oscillations, a coil coupled therewith, a pair of differentially connected oscillating circuits connected to said coil, a pair of conductors so connected to one of said circuits, a coil coupled to both said oscillating circuits as to form a condenser connected in parallel with said circuit, a three electrode vacuum tube having its grid and filament connected to said latter coil, a source of biasing voltage connected to the grid circuit, a circuit to which the plate and filament of said tube are connected, and an indicating device connected to said plate circuit.

In testimony whereof I affix my signature.

ROSS GUNN.